(12) United States Patent
Amick et al.

(10) Patent No.: US 7,043,683 B2
(45) Date of Patent: May 9, 2006

(54) DATA TRANSMISSION UPDATE TECHNIQUE IN LOW POWER MODES

(75) Inventors: Brian W. Amick, Austin, TX (US); Claude R. Gauthier, Cupertino, CA (US); Aninda Roy, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 441 days.

(21) Appl. No.: 10/360,312

(22) Filed: Feb. 7, 2003

(65) Prior Publication Data
US 2004/0156396 A1    Aug. 12, 2004

(51) Int. Cl.
G03M 13/00    (2006.01)
G01R 31/28    (2006.01)

(52) U.S. Cl. ..................... 714/814; 714/712
(58) Field of Classification Search .......... 714/814, 714/815, 811, 798, 712, 715; 370/508, 516, 370/517, 519; 713/400, 401, 500, 600
See application file for complete search history.

(56) References Cited

U.S. PATENT DOCUMENTS

| | | | |
|---|---|---|---|
| 4,451,916 A | 5/1984 | Casper et al. | |
| 4,542,380 A | 9/1985 | Beckner et al. | |
| 4,545,013 A | 10/1985 | Lyon et al. | |
| 4,562,573 A | 12/1985 | Murano et al. | |
| 4,731,588 A | 3/1988 | Addis et al. | |
| 5,844,762 A | 12/1998 | Yamamura et al. | |
| 5,956,349 A | 9/1999 | Watanabe et al. | |
| 5,963,023 A | 10/1999 | Herrell et al. | |
| 6,345,365 B1 * | 2/2002 | Takahashi et al. | 713/401 |
| 6,400,724 B1 | 6/2002 | Yao | |
| 6,463,109 B1 | 10/2002 | McCormack et al. | |
| 6,700,390 B1 | 3/2004 | Gauthier et al. | |
| 6,781,355 B1 | 8/2004 | Gauthier et al. | |
| 6,822,345 B1 | 11/2004 | Gauthier et al. | |
| 6,842,351 B1 | 1/2005 | Gauthier et al. | |
| 6,909,203 B1 | 6/2005 | Gauthier et al. | |
| 2003/0107452 A1 | 6/2003 | Novak | |
| 2003/0197430 A1 | 10/2003 | Gauthier et al. | |
| 2003/0222655 A1 | 12/2003 | Gauthier et al. | |
| 2004/0049708 A1 * | 3/2004 | Thomas et al. | 713/500 |
| 2004/0076025 A1 | 4/2004 | Gauthier et al. | |
| 2004/0123166 A1 | 6/2004 | Gauthier et al. | |
| 2004/0124715 A1 | 7/2004 | Huang et al. | |
| 2004/0165406 A1 | 8/2004 | Gauthier et al. | |
| 2004/0169571 A1 | 9/2004 | Chang et al. | |
| 2005/0110551 A1 | 5/2005 | Bonaccio et al. | |

OTHER PUBLICATIONS

Na et al., "The Effects of On-Chip and Package Decoupling Capacitors and an Efficient ASIC Decoupling Methodology", IEEE, 2004, pp. 556-567.

(Continued)

Primary Examiner—Christine T. Tu
(74) Attorney, Agent, or Firm—Osha Liang LLP

(57) ABSTRACT

A data transmission update technique for use in a low power mode and/or a low activity mode of a computer system or a portion thereof is provided. When in the low power mode and/or the low activity mode, the technique initiates a testing of data transmissions, the results of which are used to adjust the timing of data receipt such that accurate and timely date communications are facilitated.

19 Claims, 3 Drawing Sheets

OTHER PUBLICATIONS

Bai et al., "Simultaneous Switching Noise and Resonance Analysis of On-Chip Power Distribution Network", IEEE, 2002.

Na et al., "Modeling Ans Simulation of Core Switching Noise for ASICs", IEEE, 2002.

Garben et al., "Frequency Dependencies of Power Noise", IEEE, 2002., pp 166-173.

O'Sullivan et al., "Developing a Decoupling Methodology with SPICE for Multilayer Printed Circuit Boards", IEEE, 1998. pp. 652-655.

Jong et al., "Modeling and Simulation of Switching Noise Including Power/Ground Plane Resonance for High Speed GaAs FET Logic (FL) Circuits", IEEE, 1995, pp. 1081-1084.

* cited by examiner

DATA TRANSMISSION UPDATE TECHNIQUE IN LOW POWER MODES

BACKGROUND OF INVENTION

As the frequencies of modern computers continue to increase, the need to rapidly and accurately transmit data between chip interfaces also increases. To ensure that data is accurately transmitted and received, a clock signal is transmitted along with the data to allow a receiving circuit to determine when to sample the transmitted data (such transmissions are referred to and known in the art as "source synchronous" transmissions).

Typically, to ensure the greatest possibility of accurate data transmission/receipt, it is desirable for the receiving circuit to latch data during the middle of the time period in which the data is valid. In other words, if the transmitted clock signal transitions at the beginning of the time period that the data is valid, there is a likelihood of inaccurate receipt of the data due to timing variations resulting from clock skew, voltage variations, etc. To ensure that the clock signal has integrity and is referenced accurately relative to the data signal, a delay lock loop, or DLL, may be used to regenerate a copy of the clock signal at a fixed phase shift from the original.

FIG. 1 shows a portion of a typical computer system 10. The computer system 10 includes a transmitting circuit 12 and a receiving circuit 14. A data signal, DATA 16, and a clock signal, CLOCK 18, form a transmission link between the transmitting and receiving circuits 12 and 14. Data from the transmitting circuit 12 is transmitted to the receiving circuit 14 on the data signal 16, and the corresponding reference clock signal is transmitted from the transmitting circuit 12 to the receiving circuit 14 on the clock signal 18. Those skilled in the art will understand that the portion of the computer system 10 shown in FIG. 1 may include additional transmission links, e.g., data signal 13 and clock signal 15, and/or transmission links by which data is transmitted from the receiving circuit 14 to the transmitting circuit 12.

The data and clock signals 16 and 18 are used to transmit information between the transmitting circuit 12 and the receiving circuit 14 under the direction of control signals, CONTROL 20. The control signals 20, transmitted between the transmitting and receiving circuits 12 and 14, may help determine on which cycle, at what frequency, and/or under which operating mode the data and clock signals 16 and 18 should be transmitted. For example, the control signals 20 may transmit a request that the transmitting circuit 12 transmit a predetermined test pattern to the receiving circuit 14 to test and improve transmission between the transmitting and receiving circuits 12 and 14.

FIG. 2 shows the receiving circuit 14 of FIG. 1 in more detail. The receiving circuit 14 has a latch 32 and a DLL 34. The DLL 34 receives the clock signal 18 and generates a buffered, delayed copy of the clock signal 18, which then serves as a clock input to the latch 32. When toggled, the latch 32, which receives the data signal 16, latches the data signal 16 and outputs the latched data signal as a data signal, CHIP_DATA 36, that is used by the computer system (not shown).

As mentioned earlier, because of the large amounts of data transmitted across chip interfaces, it is important to make sure that data is transmitted accurately. Accordingly, designers have implemented techniques by which transmission links, and hence, data communications, are calibrated at system startup. However, after the system has been operational for some amount of time, data transmission may not be optimal due to changing system conditions, e.g., thermal and voltage gradients. Recalibration of transmission links during operation is prohibitively difficult because of the indeterministic amounts of data being transmitted. Thus, in such cases, optimal data transmission performance may not be achieved.

SUMMARY OF INVENTION

According to one aspect of the present invention, a computer system that has at least a portion capable of operating in a normal mode and a low power mode comprises: a transmission link arranged to propagate a data signal and a clock signal; and calibration circuitry, operatively connected to the clock signal and dependent on a power mode control signal, capable of updating a receipt time of the data signal, where the power mode control signal is indicative of whether the at least a portion is in the low power mode.

According to another aspect, a method for updating data communication comprises: transmitting a clock signal and a data signal; latching the data signal dependent on an adjustable clock signal, where the adjustable clock signal is dependent on the clock signal; and when in a low power mode, (1) transmitting a test pattern signal on the data signal, (2) latching the test pattern signal to generate a latched test pattern signal, (3) comparing the test pattern signal and the latched test pattern signal, and (4) adjusting the adjustable clock signal dependent on the comparing.

According to another aspect, a computer system that has at least a portion capable of operating in a low power mode and a normal mode comprises: means for propagating a data signal and a clock signal; means for latching the data signal dependent on an adjustable clock signal, where the adjustable clock signal dependent on the clock signal; and means for adjusting the adjustable clock signal when in the low power mode.

According to another aspect, a computer system comprises a transmission link arranged to propagate a data signal and a clock signal and calibration circuitry operatively connected to the clock signal and capable of updating a receipt time of the data signal when the transmission link is in at least one of a low activity state and a low power mode.

Other aspects and advantages of the invention will be apparent from the following description and the appended claims.

DETAILED DESCRIPTION

Because transmission link calibration during normal mode operation is prohibitively difficult and potentially adverse to data transmission performance, embodiments of the present invention relate to a technique for calibrating/updating data transmission in a low power mode. Because only small amounts of data are transmitted during the low power mode, taking a particular transmission link off-line for a short amount of time for calibration does not have as large as a impact on system performance than in the case when the transmission link is taken off-line and calibrated in a normal, i.e., not a low power, mode.

Those skilled in the art will understand that a low power mode may refer to situations related to wait instructions, sleep modes, hibernate modes, standby modes, etc. In general, low power mode refers to any mode that brings a circuit or a portion thereof into a low power state.

As mentioned, in the prior art, the calibration of a transmission link occurs only once during the power-on/reset of a particular system. In the present invention, a system is arranged such that the transmission link may be periodically tested and updated during system operation.

Figure 1:
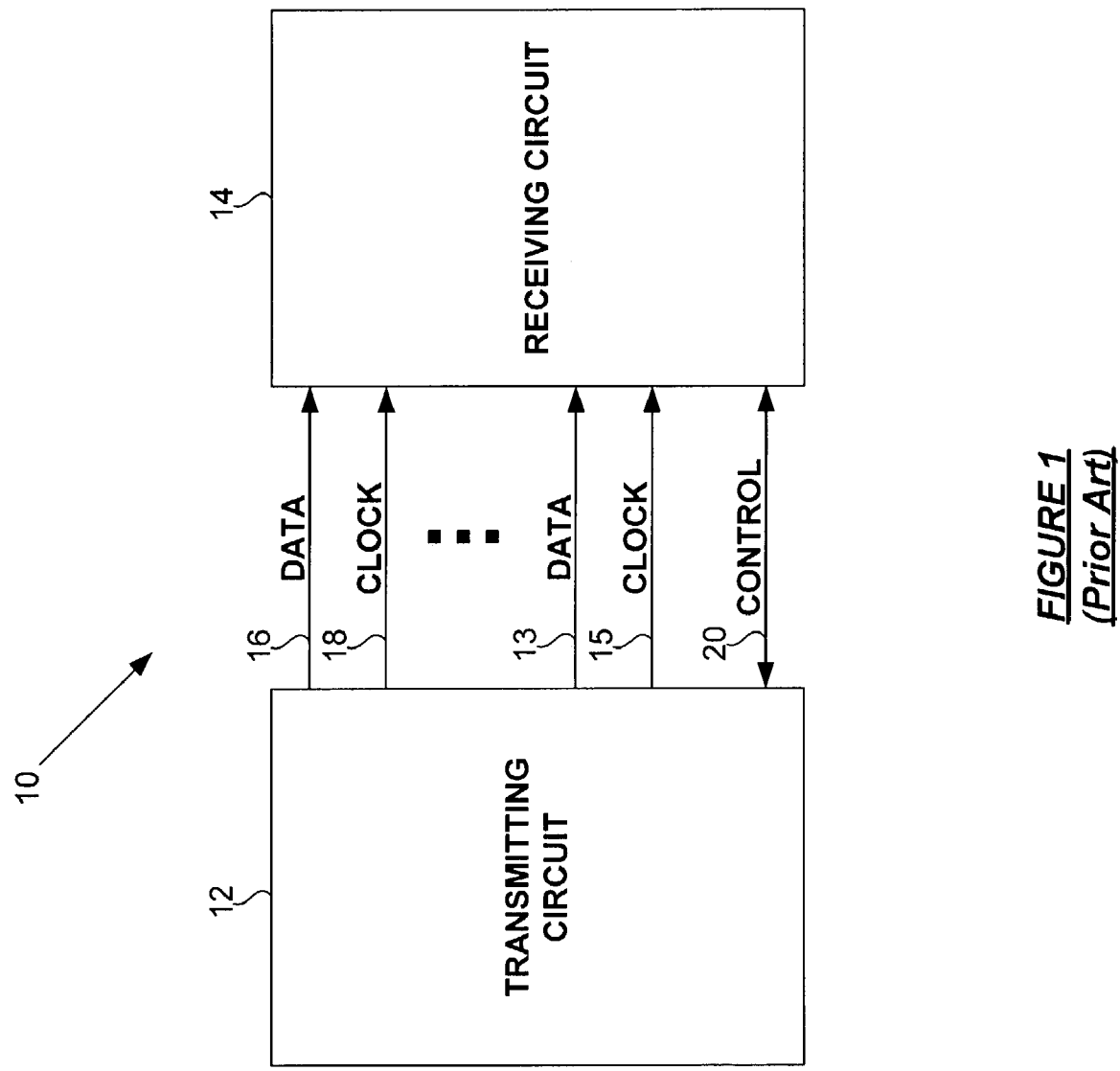
FIG. 1 shows a portion of a typical computer system.
Figure 2:
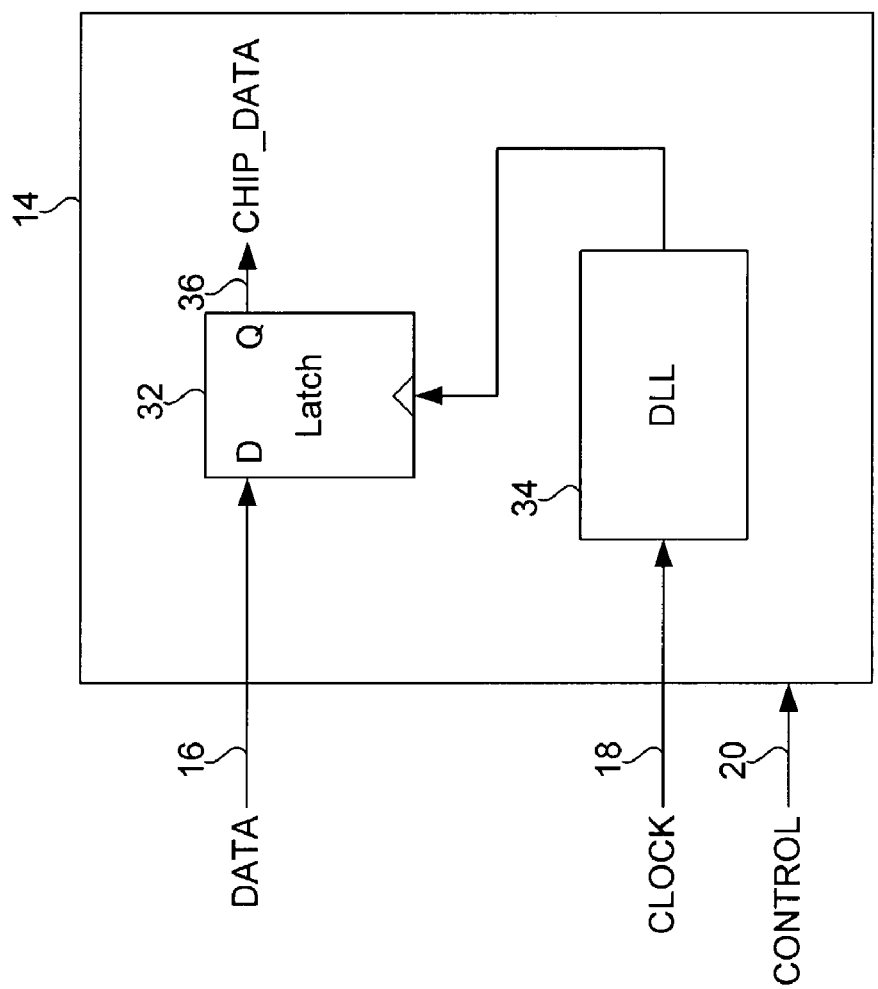
FIG. 2 shows a typical receiving circuit.
Figure 3:
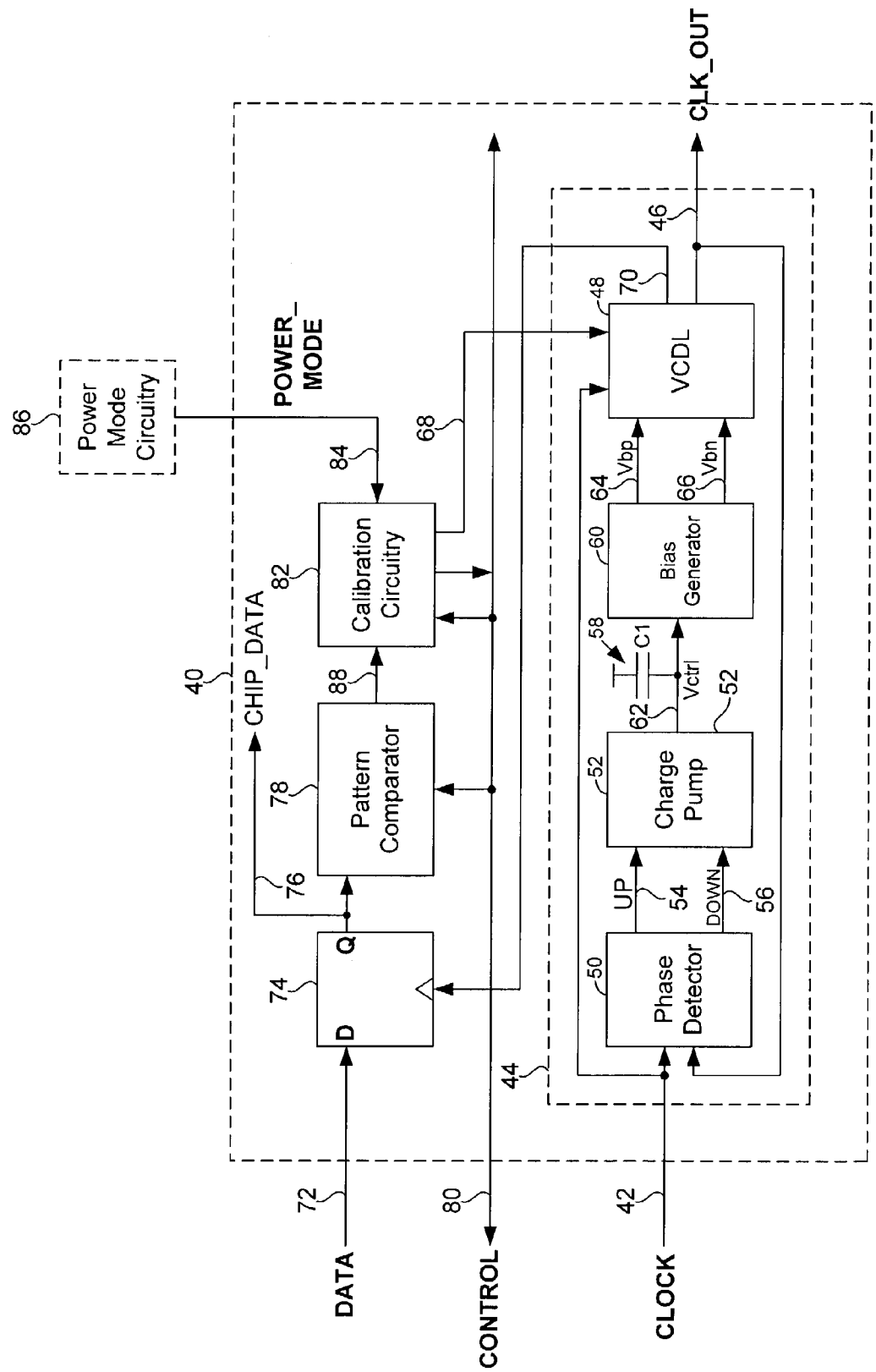
FIG. 3 shows a receiving circuit in accordance with an embodiment of the present invention.

FIG. 3 shows a block diagram of an exemplary receiving circuit 40 in accordance with an embodiment of the present invention. A clock signal, CLOCK 42 is input to a DLL 44 in order for the DLL 44 to generate a phased output signal, CLK_OUT 46. The clock signal 42 is used as an input to a voltage-controlled delay line (VCDL) 48 and to a phase detector 50. The phase detector 50 measures whether a phase difference between the clock signal 42 and the phased output signal 46 of the delay path is correct. An adjustment in the phase delay produces signals that control a charge pump 52. The phase detector 50 indicates that the charge pump 52 should increase or decrease its output using up pulses, UP 54, and down pulses, DOWN 56. The charge pump 52 adds or removes charge from a capacitor $C_1$ 58 that changes a voltage potential at the input of a bias-generator 60. The capacitor 58 is connected between a power supply $V_{DD}$ and a control voltage $V_{CTRL}$ 62. In response to the control voltage $V_{CTRL}$ 62, the bias-generator 60 produces control voltages $V_{BP}$ 64 and $V_{BN}$ 66 that control the delay of the voltage-controlled delay line 48.

The voltage-controlled delay line 48 may be implemented using current starved elements. This means that the delays are controlled by modifying the amount of current available for charging and discharging capacitances. The linearity of a voltage-controlled delay line's characteristics determines the stable range of frequencies over which the DLL can operate. The phased output signal 46 from the voltage-controlled delay line 48 provides a phase delayed copy of the clock signal 42 to other circuits.

Still referring to FIG. 3, the negative feedback of the phased output signal 46 adjusts the delay through the voltage-controlled delay line 48. The phase detector 50 integrates the phase error that results between the periodic input of the clock signal 42 and the phased output signal 46. The voltage-controlled delay line 48, in response to the phase detector 50, delays the phased output signal 46 by a fixed amount of time such that a desired delay between the clock signal 42 and the phased output signal 46 is maintained.

The voltage-controlled delay line 48 also receives an offset signal 68. The value of the offset signal 68 determines which tap should be used in the voltage-controlled delay line 48 to generate an adjustable clock signal 70. The offset signal 68 may be an analog signal, or a serial or parallel digital signal. While the DLL maintains a fixed delay between the clock signal 42 and the phased output signal 46, the value of the offset signal 68 adjusts the delay between the clock signal 42 and the adjustable clock signal 70. The adjustable clock signal 70 determines when to latch the incoming data on a data signal 72.

Those skilled in the art will understand that, in one or more other embodiments, the adjustable clock signal 70 may be generated from a digital delay line in place of the analog, voltage-controlled delay line 48. In other embodiments, the adjustable clock signal 70 may be generated from a delay line connected to the phased output signal 46 outside of the feedback loop. The delay lines in these embodiments generate the adjustable clock signal 70 based on the value of the offset signal 68. In other embodiments, the value of the offset signal 68 may be used to determine at which point in the delay line to tap.

The data on the data signal 72 arrives at flip-flop 74. The data on the data signal 72 are latched depending on the arrival time of the adjustable clock signal 70 to generate a latched data signal on a data signal, CHIP_DATA 76. Depending on the arrival time of the adjustable clock signal 70, some or all of the latched data may not equal the same state as the data on data signal 72.

A pattern comparator 78 is used to test and improve transmission across the link that includes clock signal 42 and the data signal 72. A predetermined test pattern signal is transmitted on the data signal 72 under the direction of a control signal 80. In some embodiments, the test pattern signal may be transmitted for only one cycle. In other embodiments, the test pattern signal may have a duration that lasts for several cycles. As mentioned earlier, the test pattern signal is latched by the flip-flop 74 based on the adjustable clock signal 70. The resulting latched test pattern signal on data signal 76 is compared with the predetermined test pattern signal by the pattern comparator 78.

The initiation of the testing is performed by calibration circuitry 82 that receives a power mode control signal, POWER_MODE 84, which is indicative of whether the computer system or a portion thereof is in a low power mode. In response to the power mode control signal mode signal 84, the calibration circuitry 82 is used to calibrate data communications. In an embodiment of the present invention, the power mode control signal 84 may be generated by power mode circuitry 86 that may reside on or outside of the receiving circuit 40.

In FIG. 5, an adjustment circuit is part of the voltage-controlled delay line 48. The value of the offset signal 68 may select from one of several taps in the delay chain of the voltage-controlled delay line 48 to generate the adjustable clock signal 70.

The calibration circuitry 82 selects a value of the offset signal 68 to select a timing of the adjustable clock signal 70 relative to the test pattern signal on the data signal 72. The latched test pattern signal on data signal 76 is compared with the test pattern signal by the pattern comparator 78 to determine whether the latched test pattern signal is the same as the test pattern signal. The pattern comparator 78 may send comparison results on signal line 88 to the calibration circuitry 82 that indicate a pass or fail, or the number of bits that were not the same.

The calibration circuitry 82 may select a different value for the offset signal 68 and repeat the transmission of the test pattern signal, the latching of the test pattern signal, and the comparing of the test pattern signal to the latched test pattern signal. The pattern comparator 78 sends the results on signal line 88 to the calibration circuitry 82. A set of tests with different selected values for the offset signal 68 may indicate a best selected value or a range of selected values for the offset signal 68. The calibration circuitry 82 fixes the selected value for the offset signal 68 to improve/update/calibrate data transmissions. Data signals transmitted across a transmission link under non-test, i.e., in normal mode, conditions may have a higher probability of successful transmission after the value of the offset signal 68 is appropriately selected.

In one or more embodiments, a counter may be implemented to track the amount of time a computer system or portion thereof is in a low power mode. In this case, only after the counter has counted a particular duration of time will the data communication updating occur.

In situations when a computer system is in constant use, a low power mode may not be initiated. Therefore, in one or more embodiments, when a period of low activity is detected, a transmission link may be calibrated as shown in FIG. 3. For example, during a normal mode, the number of null packets, i.e., incoming data groups that do not contain real data, may be counted for a particular amount of time. If it is found that real data is being transferred at a rate lower than some threshold data/cycle rate, the transmission link may be pulled off-line and calibrated. Those skilled in the art will note that such a technique does not severely effect system performance and does not waste substantial amounts of power because such calibration occurs during a low activity mode. Moreover, those skilled in the art will understand that the calibration of a transmission link may occur in a computer system designed for both low activity mode and low power mode calibration, or in a computer system designed to calibrate a transmission link in one of either the low activity mode or the low power mode.

Advantages of the present invention may include one or more of the following. In one or more embodiments, because data communications may be updated after power up of a computer system, accurate and timely data transmission may be ensured during computer operation; hence, system performance may be improved.

In one or more embodiments, because data communication is updated in a low power mode, adverse data transmission effects resulting from updating in a normal mode may be avoided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system having at least a portion capable of operating in a normal mode and a low power mode, comprising:
   a transmission link arranged to propagate a data signal and a clock signal; and
   calibration circuitry, operatively connected to the clock signal and dependent on a power mode control signal, capable of updating a receipt time of the data signal,
      wherein the power mode control signal is indicative of whether the at least a portion is in the low power mode.

2. The computer system of claim 1, the computer system further comprising:
   a latch device arranged to latch the data signal.

3. The computer system of claim 2, the computer system further comprising:
   an adjustment circuit arranged to adjust a timing of an adjustable clock signal dependent on the clock signal and the calibration circuitry, wherein the latch device is responsive to the adjustable clock signal.

4. The computer system of claim 3, wherein the adjustable clock signal is generated from one selected from the group consisting of a voltage controlled delay line, a digital delay line, and an analog delay line.

5. The computer system of claim 2, the computer system further comprising:
   a pattern comparator arranged to generate an output signal dependent on a comparison of a latched test pattern signal and a test pattern signal,
      wherein the latch device is arranged to latch the test pattern signal from the data signal to generate the latched test pattern signal.

6. The computer system of claim 5, wherein the calibration circuitry is arranged to receive the output signal from the pattern comparator.

7. The computer system of claim 1, wherein the calibration circuitry is dependent on a counter.

8. The computer system of claim 1, further comprising:
   circuitry arranged to generate the power mode control signal.

9. The computer system of claim 8, wherein the circuitry is arranged to initiate a test of the transmission link.

10. The computer system of claim 1, wherein the calibration circuitry is arranged to initiate a test of the transmission link.

11. A method for updating data communication, comprising:
    transmitting a clock signal and a data signal; and
    latching the data signal dependent on an adjustable clock signal,
       wherein the adjustable clock signal is dependent on the clock signal;
    when in a low power mode,
       transmitting a test pattern as the data signal,
       latching the test pattern to generate a latched test pattern,
       comparing the test pattern and the latched test pattern, and
       adjusting the adjustable clock signal dependent on the comparing.

12. The method of claim 11, the adjusting comprising:
    delaying the clock signal.

13. A computer system having at least a portion capable of operating in a low power mode and a normal mode, comprising:
    means for propagating a data signal and a clock signal;
    means for latching the data signal dependent on an adjustable clock signal,
       wherein the adjustable clock signal is dependent on the clock signal; and
    means for adjusting the adjustable clock signal when in the low power mode, the
       means for adjusting comprising:
          means for comparing a latched test pattern signal and a test pattern signal; and
          means for delaying the clock signal to generate the adjustable clock signal dependent on the means for comparing.

14. A computer system, comprising:
    a transmission link arranged to propagate a data signal and a clock signal; and
    calibration circuitry operatively connected to the clock signal and capable of updating a receipt time of the data signal when the transmission link is in at least one of a low activity state and a low power mode.

15. The computer system of claim 14, wherein the low activity state occurs when a particular amount of data has not been transferred across the transmission link in a particular amount of time.

16. The computer system of claim 14, the computer system further comprising:
an adjustment circuit arranged to adjust a timing of an adjustable clock signal dependent on the clock signal and the calibration circuitry,
wherein a latch device arranged to latch the data signal is responsive to the adjustable clock signal.

17. The computer system of claim 16, wherein the adjustable clock signal is generated from one selected from the group consisting of a voltage controlled delay line, a digital delay line, and an analog delay line.

18. The computer system of claim 16, the computer system further comprising:
a pattern comparator arranged to generate an output signal dependent on a comparison of a latched test pattern signal and a test pattern signal,
wherein the latch device is arranged to latch the test pattern signal from the data signal to generate the latched test pattern signal.

19. The computer system of claim 18, wherein the calibration circuitry is arranged to receive the output signal from the pattern comparator.

* * * * *